US012596867B2

(12) United States Patent (10) Patent No.: US 12,596,867 B2
Ghoneim et al. (45) Date of Patent: Apr. 7, 2026

(54) DETECTING COMPUTER-GENERATED HALLUCINATIONS USING PROGRESSIVE SCOPE-OF-ANALYSIS ENLARGEMENT

(71) Applicant: Microsoft Technology Licensing, LLC, Redmond, WA (US)

(72) Inventors: Ahmed Elgohary Ghoneim, Redmond, WA (US); Pengcheng He, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 18/373,547

(22) Filed: Sep. 27, 2023

(65) Prior Publication Data

US 2025/0103800 A1 Mar. 27, 2025

(51) Int. Cl.
| | |
|---|---|
| *G06F 40/194* | (2020.01) |
| *G06F 40/289* | (2020.01) |
| *G06F 40/35* | (2020.01) |

(52) U.S. Cl.
CPC .......... *G06F 40/194* (2020.01); *G06F 40/289* (2020.01); *G06F 40/35* (2020.01)

(58) Field of Classification Search
CPC ....... G06F 40/194; G06F 40/289; G06F 40/35
See application file for complete search history.

(56) References Cited

U.S. PATENT DOCUMENTS

| | | | | |
|---|---|---|---|---|
| 12,118,295 | B2 * | 10/2024 | Aggarwal | ............. G06F 40/289 |
| 2023/0252225 | A1 * | 8/2023 | Zhelezniak | .............. G06N 5/01 |
| | | | | 715/254 |
| 2023/0376677 | A1 * | 11/2023 | Choubey | ................... G06N 3/09 |
| 2024/0061874 | A1 * | 2/2024 | Arslan | .................... G06N 20/00 |
| 2024/0184988 | A1 * | 6/2024 | Sridhar | ................... G06F 16/36 |
| 2024/0386253 | A1 * | 11/2024 | White, Jr. | ............. G06F 40/166 |
| 2025/0061279 | A1 * | 2/2025 | deLevie | ................ G06F 40/131 |
| 2025/0061286 | A1 * | 2/2025 | Zhou | ........................ G06F 40/30 |

OTHER PUBLICATIONS

Devlin, et al., "BERT: Pre-training of Deep Bidirectional Transformers for Language Understanding," arXiv, Cornell University, arXiv:1810.04805v2 [cs.CL], May 24, 2019, 16 pages.

(Continued)

*Primary Examiner* — Daniel C Washburn
*Assistant Examiner* — Paul J. Mueller

(57) ABSTRACT

A technique determines whether a target item is adequately supported by a source item, and therefore likely free of hallucinations. The technique operates by progressively expanding a scope of source content to be considered when determining whether an individual target part of the target item has support in the source item. For instance, the technique initially determines whether any individual source part in the source item supports the target part. If this stage fails to identify support, the technique next considers whether a larger portion of the source item supports the particular target item. In some implementations, the technique selects a scope of analysis at a particular stage by choosing a group of source parts that most closely match the target part under consideration. The technique concatenates those source parts in the same order in which they appear in the source item.

16 Claims, 10 Drawing Sheets

(56) References Cited

OTHER PUBLICATIONS

Vaswani, et al., "Attention Is All You Need," arXiv, Cornell University, arXiv:1706.03762v5 [cs.CL], Dec. 6, 2017, 11 pages.
Radford, et al., "Improving Language Understanding by Generative Pre-Training," available at http://cdn.openai.com/research-covers/language-unsupervised/language_understanding_paper.pdf, OpenAI, San Francisco, California, Jun. 11, 2018, 12 pages.
Touvron, et al., "LLaMA: Open and Efficient Foundation Language Models," arXiv, Cornell University, arXiv:2302.13971v1 [cs.CL], Feb. 27, 2023, 27 pages.
Laban, et al., "SummaC: Re-Visiting NLI-based Models for Inconsistency Detection in Summarization," in Transactions of the Association for Computational Linguistics, vol. 10, Feb. 2022, pp. 163-177.
Kryscinski, et al., "Evaluating the Factual Consistency of Abstractive Text Summarization," in Proceedings of the 2020 Conference on Empirical Methods in Natural Language Processing, Nov. 2020, pp. 9332-9346.
JI, et al., "Survey of Hallucination in Natural Language Generation," arXiv, arXiv:2202.03629v5 [cs.CL], Nov. 7, 2022, 47 pages.
Scao, et al., "BLOOM: A 176B-Parameter Open-Access Multilingual Language Model," arXiv, Cornell University, arXiv:2211.05100v2 [cs_CL], Dec. 11, 2022, 62 pages.
Brown, et al., "Language Models are Few-Shot Learners," arXiv, Cornell University, arXiv:2005.14165v4 [cs.CL], Jul. 22, 2020, 75 pages.
International Search Report Received in PCT Application No. PCT/US2024/043790, mailed on Nov. 20, 2024, 16 pages.

* cited by examiner

FIG. 2

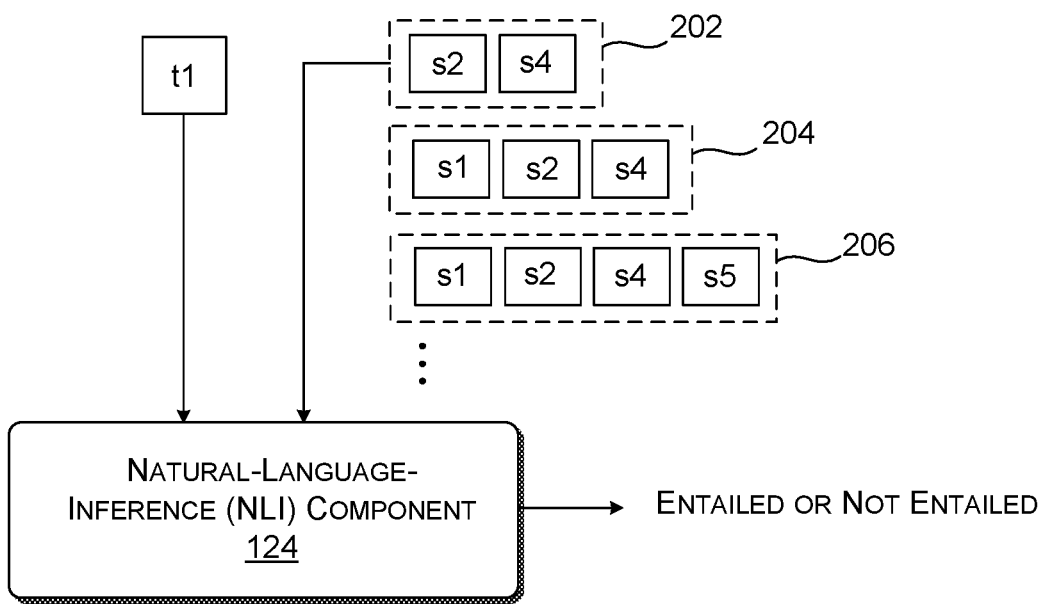
FIG. 3
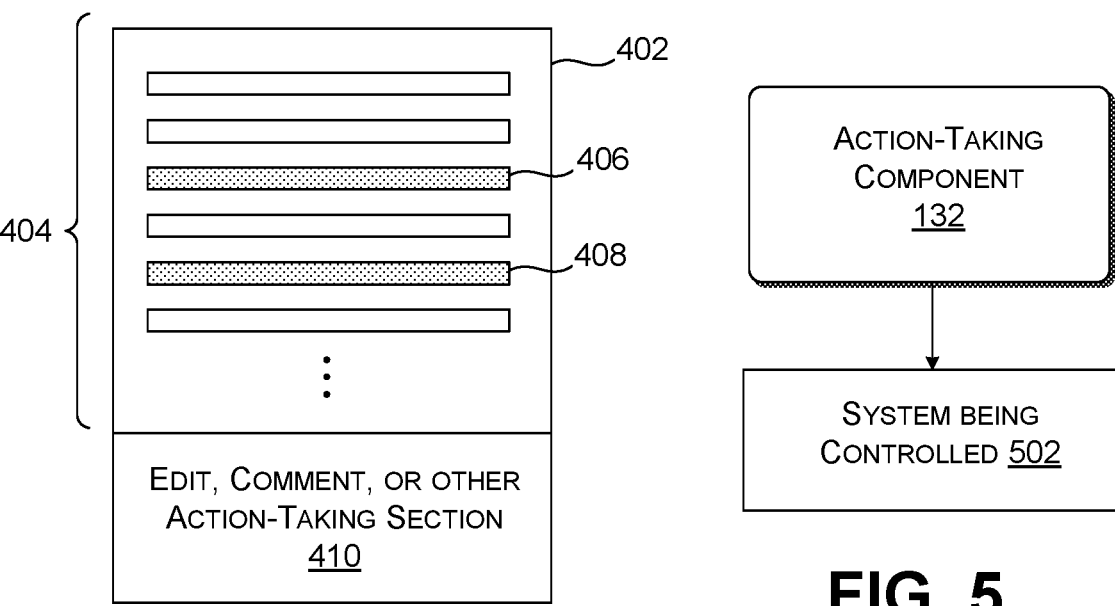
FIG. 4
FIG. 5

FIG. 6

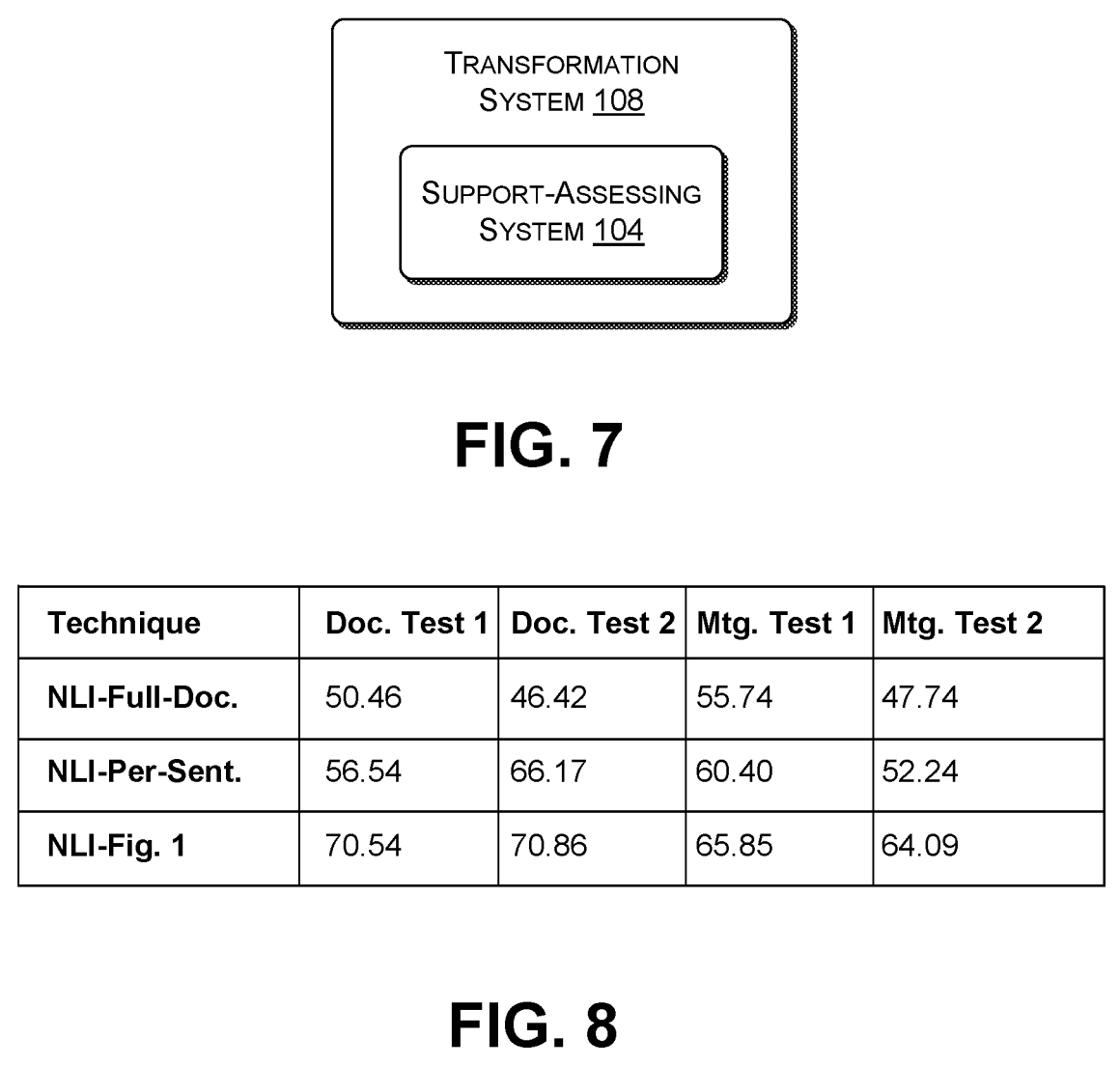

TRANSFORMATION
SYSTEM <u>108</u>

SUPPORT-ASSESSING
SYSTEM <u>104</u>

FIG. 7

| Technique | Doc. Test 1 | Doc. Test 2 | Mtg. Test 1 | Mtg. Test 2 |
|---|---|---|---|---|
| NLI-Full-Doc. | 50.46 | 46.42 | 55.74 | 47.74 |
| NLI-Per-Sent. | 56.54 | 66.17 | 60.40 | 52.24 |
| NLI-Fig. 1 | 70.54 | 70.86 | 65.85 | 64.09 |

FIG. 8

Figure 9:
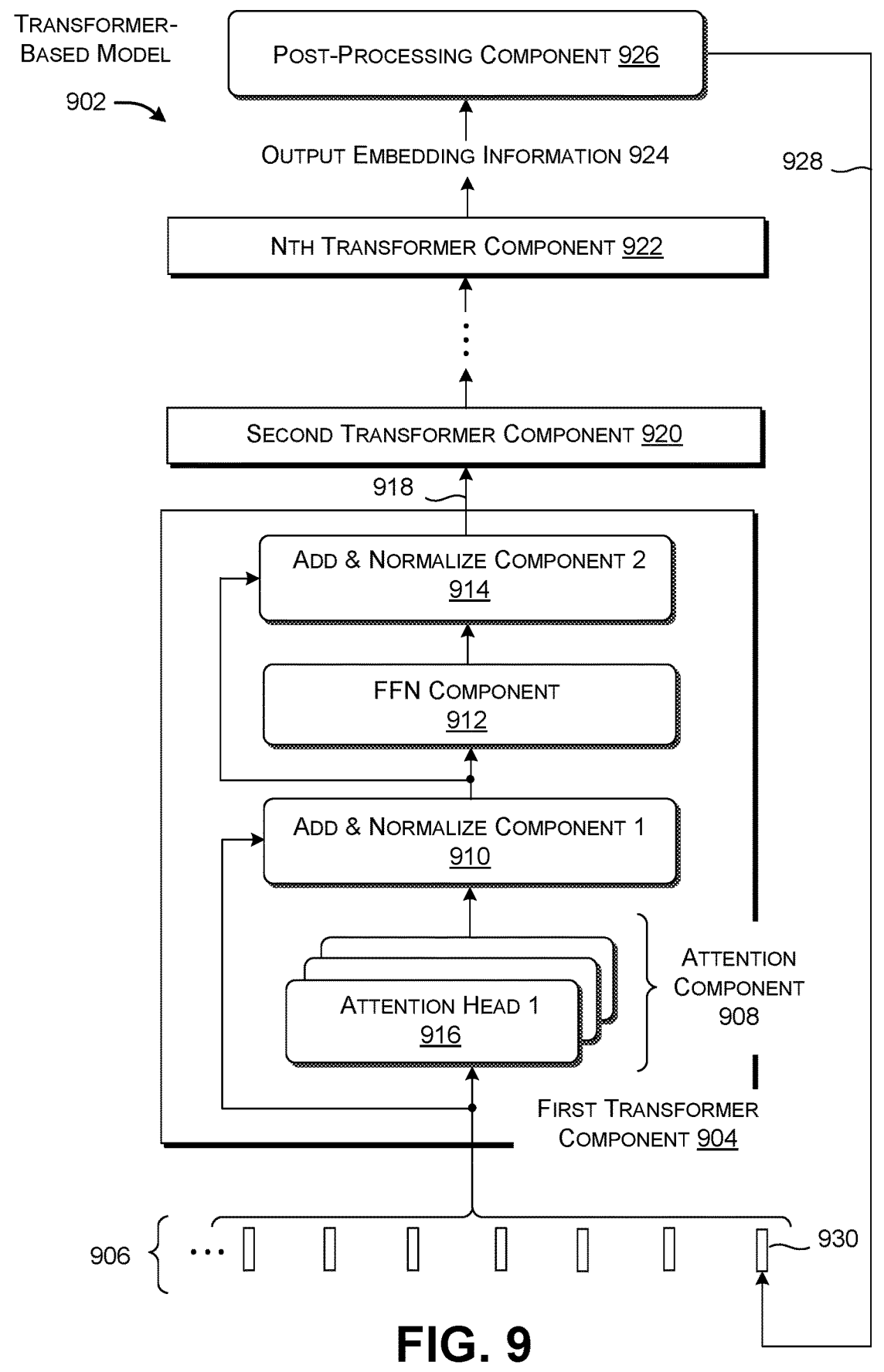

TRANSFORMER-
BASED MODEL

902 ⟶

POST-PROCESSING COMPONENT 926

OUTPUT EMBEDDING INFORMATION 924

928

NTH TRANSFORMER COMPONENT 922

SECOND TRANSFORMER COMPONENT 920

918

ADD & NORMALIZE COMPONENT 2
914

FFN COMPONENT
912

ADD & NORMALIZE COMPONENT 1
910

ATTENTION HEAD 1
916

ATTENTION
COMPONENT
908

FIRST TRANSFORMER
COMPONENT 904

Figure 10:
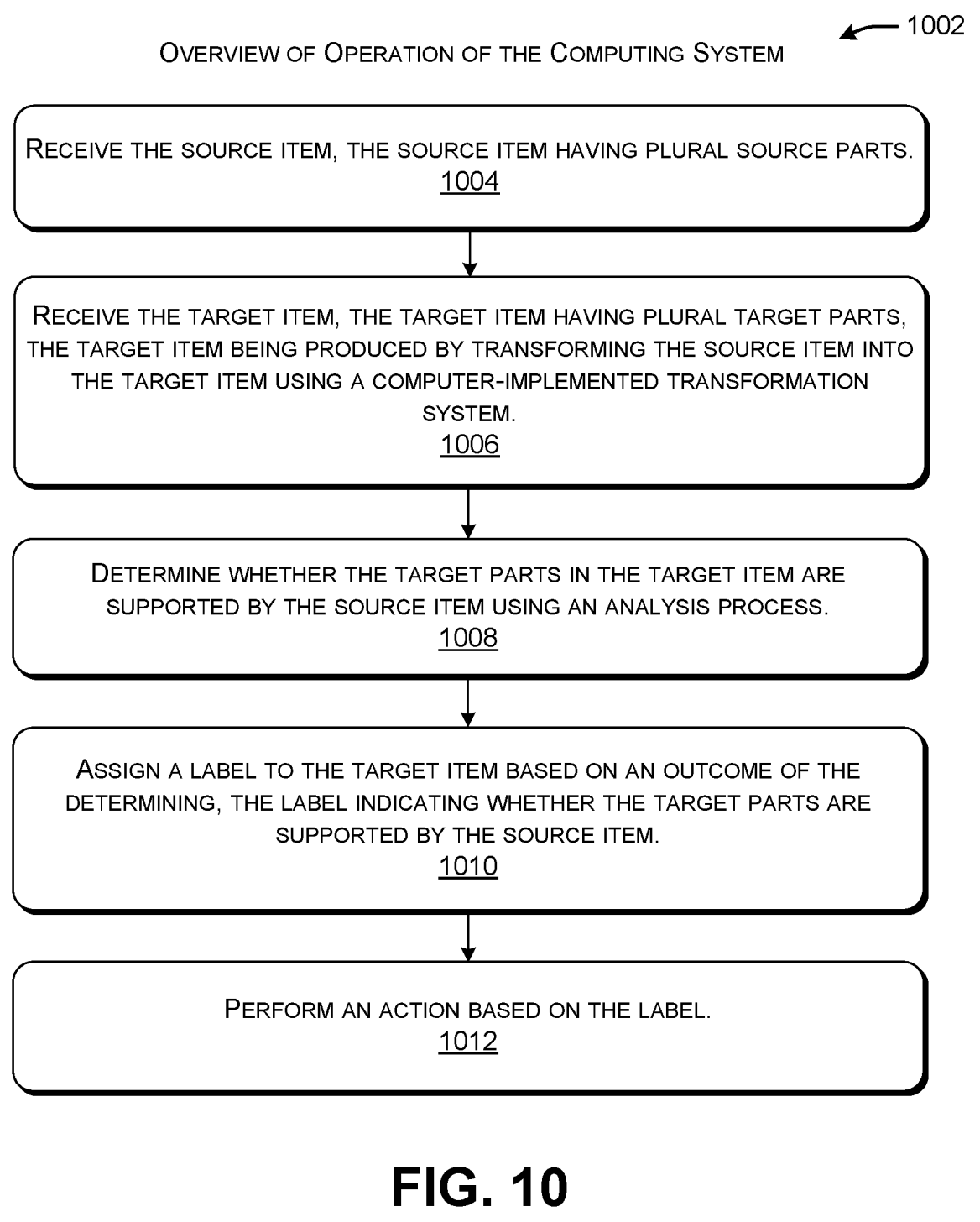

Overview of Operation of the Computing System                    ← 1002

> RECEIVE THE SOURCE ITEM, THE SOURCE ITEM HAVING PLURAL SOURCE PARTS.
> 1004

> RECEIVE THE TARGET ITEM, THE TARGET ITEM HAVING PLURAL TARGET PARTS, THE TARGET ITEM BEING PRODUCED BY TRANSFORMING THE SOURCE ITEM INTO THE TARGET ITEM USING A COMPUTER-IMPLEMENTED TRANSFORMATION SYSTEM.
> 1006

> DETERMINE WHETHER THE TARGET PARTS IN THE TARGET ITEM ARE SUPPORTED BY THE SOURCE ITEM USING AN ANALYSIS PROCESS.
> 1008

> ASSIGN A LABEL TO THE TARGET ITEM BASED ON AN OUTCOME OF THE DETERMINING, THE LABEL INDICATING WHETHER THE TARGET PARTS ARE SUPPORTED BY THE SOURCE ITEM.
> 1010

> PERFORM AN ACTION BASED ON THE LABEL.
> 1012

Figure 11:
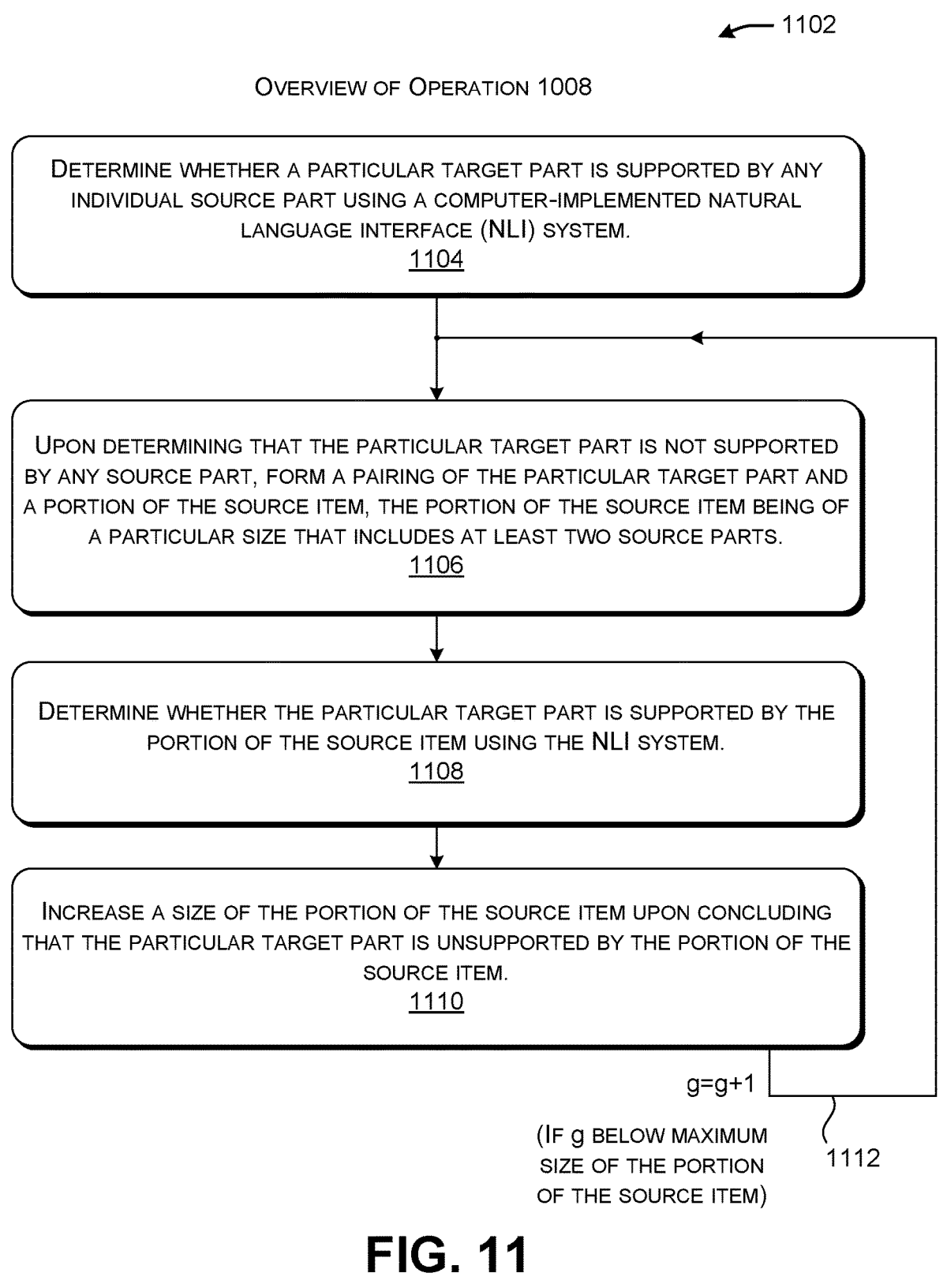

OVERVIEW OF OPERATION 1008

DETERMINE WHETHER A PARTICULAR TARGET PART IS SUPPORTED BY ANY INDIVIDUAL SOURCE PART USING A COMPUTER-IMPLEMENTED NATURAL LANGUAGE INTERFACE (NLI) SYSTEM.
1104

UPON DETERMINING THAT THE PARTICULAR TARGET PART IS NOT SUPPORTED BY ANY SOURCE PART, FORM A PAIRING OF THE PARTICULAR TARGET PART AND A PORTION OF THE SOURCE ITEM, THE PORTION OF THE SOURCE ITEM BEING OF A PARTICULAR SIZE THAT INCLUDES AT LEAST TWO SOURCE PARTS.
1106

DETERMINE WHETHER THE PARTICULAR TARGET PART IS SUPPORTED BY THE PORTION OF THE SOURCE ITEM USING THE NLI SYSTEM.
1108

INCREASE A SIZE OF THE PORTION OF THE SOURCE ITEM UPON CONCLUDING THAT THE PARTICULAR TARGET PART IS UNSUPPORTED BY THE PORTION OF THE SOURCE ITEM.
1110

$g = g + 1$ (IF $g$ BELOW MAXIMUM SIZE OF THE PORTION OF THE SOURCE ITEM)    1112

OVERVIEW OF OPERATION 1106

SELECT A GROUP OF PARTICULAR SOURCE PARTS THAT MOST CLOSELY MATCH THE PARTICULAR TARGET PART, THE GROUP HAVING A PREDETERMINED NUMBER OF SOURCE PARTS.
1204

CONCATENATE THE PARTICULAR SOURCE PARTS IN AN ORDER THAT MATCHES AN ORDER IN WHICH THE PARTICULAR SOURCE PARTS APPEAR IN THE SOURCE ITEM.
1206

DETECTING COMPUTER-GENERATED HALLUCINATIONS USING PROGRESSIVE SCOPE-OF-ANALYSIS ENLARGEMENT

BACKGROUND

Machine-trained models have proven increasingly adept in various applications at transforming source items (e.g., source documents) into a target items (e.g., target documents). But machine-trained models can also produce unacceptable results in some cases. A generative machine-trained model, for instance, can produce output results that exhibit a phenomenon commonly referred to as hallucinations. A target item contains a hallucination when it makes an assertion that it is not empirically supported by (or "entailed by") the evidence provided in the source item. For example, consider the case in which the generative machine-trained model performs the task of abstractive summarization. A target item contains a hallucination when a generated summary contains a sentence that is not supported by the text of the source document. In some cases, for instance, the summary may state a purported fact that is not contained in, or inferable from, the source document.

The presence of hallucinations can lead to various kinds of negative consequences. In some cases, hallucinations corrupt the information provided by an application to end users. For instance, this information may provide faulty guidance to end users, e.g., by providing incorrect travel itinerary information or meeting summary information. In other cases, hallucinations cause an automated system to perform an incorrect control action.

SUMMARY

A technique is described herein for determining whether a target item is adequately supported by a source item, and therefore likely free of hallucinations. The source item has plural source parts, and the target item has one or more target parts. In some implementations, the technique operates by progressively expanding a scope of source content to be considered when determining whether an individual target part has support in the source item. For instance, the technique initially determines whether any individual source part in the source item supports the target part. If this stage fails to identify support, the technique next considers whether a larger portion of the source item supports the target item. The process continues until support is found or a largest scope of analysis is reached without a finding of support.

In some implementations, the technique selects a scope of analysis at a particular stage by selecting a group of source parts that most closely match the target part under consideration. The group has a stage-specific number of source parts, e.g., starting at two source parts and progressing to a maximum of six source parts. The technique then concatenates those source parts in the same order in which they appear in the source item.

In some cases, the source item is a source document having a plural source sentences. Here, each source sentence is a source part. In other cases, the source item is a dialogue having plural dialogue turns. Here, each turn is a source part.

In some implementations, the computer-implemented transformation system is an abstractive summarization system that summarizes source content.

In some implementations, the technique performs an action upon a finding that the target item is not supported by the source item. The action depends on the applicationrelated context in which the technique is used. For example, the action includes any of: generating an output presentation that identifies any target parts that are not supported by the source item; and/or generating another target item (with the objective of producing a target item that is free of hallucinations); and/or automatically removing any target part that has been identified as unsupported by the source item; and/or suspending or revising an automated control action, etc.

The technique is technically advantageous because it accurately identifies hallucinations in computer-generated content. The technique leverages this insight to reduce the occurrence of hallucinations and their negative downstream consequences. For example, the technique reduces the cases in which improper guidance is given to a user, or improper control actions are performed. Further, the technique reduces the amount of manual operations that are required to correct or otherwise address the presence of errors in target items.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF DRAWINGS

FIG. 2 shows an example of the operation of the support-assessing system of FIG. 1 at different stages of analysis.

FIG. 3 is a continuation of the example of FIG. 2.

FIG. 4 shows an example of an output presentation that is produced by the computing system of FIG. 1.

FIG. 5 shows one example of an action-taking component, which performs an action based on an outcome of analysis performed by the support-assessing system of FIG. 1.

FIG. 6 is a flowchart that shows one manner of operation of the support-assessing system of FIG. 1.

FIG. 7 shows an alternative implementation of the computing system of FIG. 1 in which the support-assessing system is a component of the transformation system.

FIG. 8 shows illustrative test results that compare the performance of the computing system of FIG. 1 with the performance of two alternative techniques.

FIG. 9 shows an illustrative language model for implementing various functions of the computing system of FIG. 1.

FIG. 10 is a flowchart that provides an overview of one manner of operation of the support-assessing system of FIG. 1.

FIG. 11 is a flowchart that provides further illustrative details regarding an operation in the flowchart of FIG. 10.

The same numbers are used throughout the disclosure and figures to reference like components and features.

DETAILED DESCRIPTION

Figure 1:
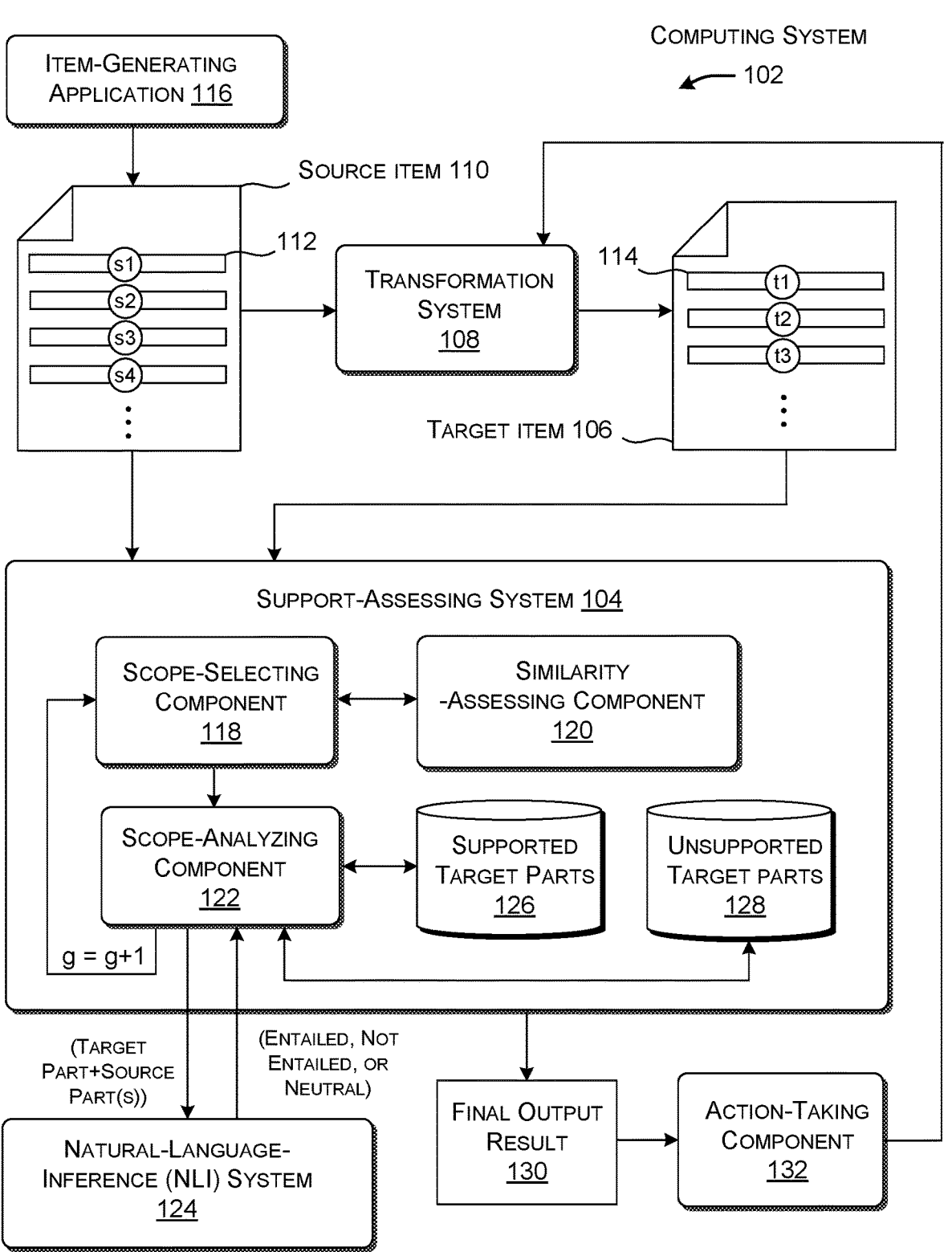
FIG. 1 shows a computing system having a support-assessing system for identifying hallucinations in target content. The target content is produced by a transformation system by operating on a source item.

FIG. 1 shows a computing system 102 that includes a support-assessing system 104 for identifying hallucinations in a target item 106. A transformation system 108 produces the target item 106 by operating on a source item 110. The source item 110 has plural source parts, such as a representative source part 112. The target item 106 has at least one target part, such as a representative target part 114. In some examples, a part is a sentence of a document of any type. In other examples, a part is a dialogue turn of a dialogue. Other applications define what constitutes a part in other ways. For instance, a part can be a part of a sentence, such as a clause or entity relation.

In some examples, the computing system 102 is implemented as a service provided by one or more servers, to which individual computing devices have access. Alternatively, or in addition, at least part of the computing system 102 is implemented by a local computing device. For example, a user computing device can execute the functions of the computing system 102. In some examples, the functions of the computing system 102 are performed or invoked by a particular application, examples of which are provided below.

Figures 12, 13:
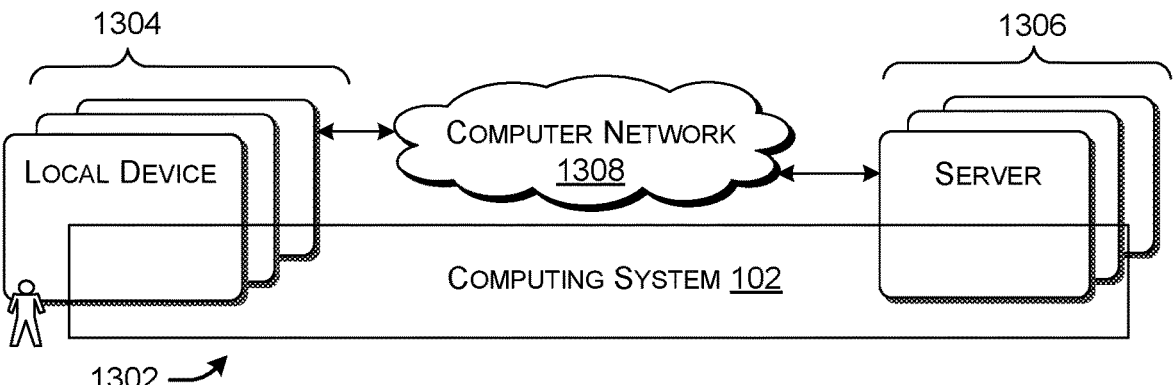
FIG. 12 is a flowchart that provides further illustrative details regarding an operation in the flowchart of FIG. 11.
FIG. 13 shows computing equipment that, in some implementations, is used to implement the computing system of FIG. 1.
Figure 14:
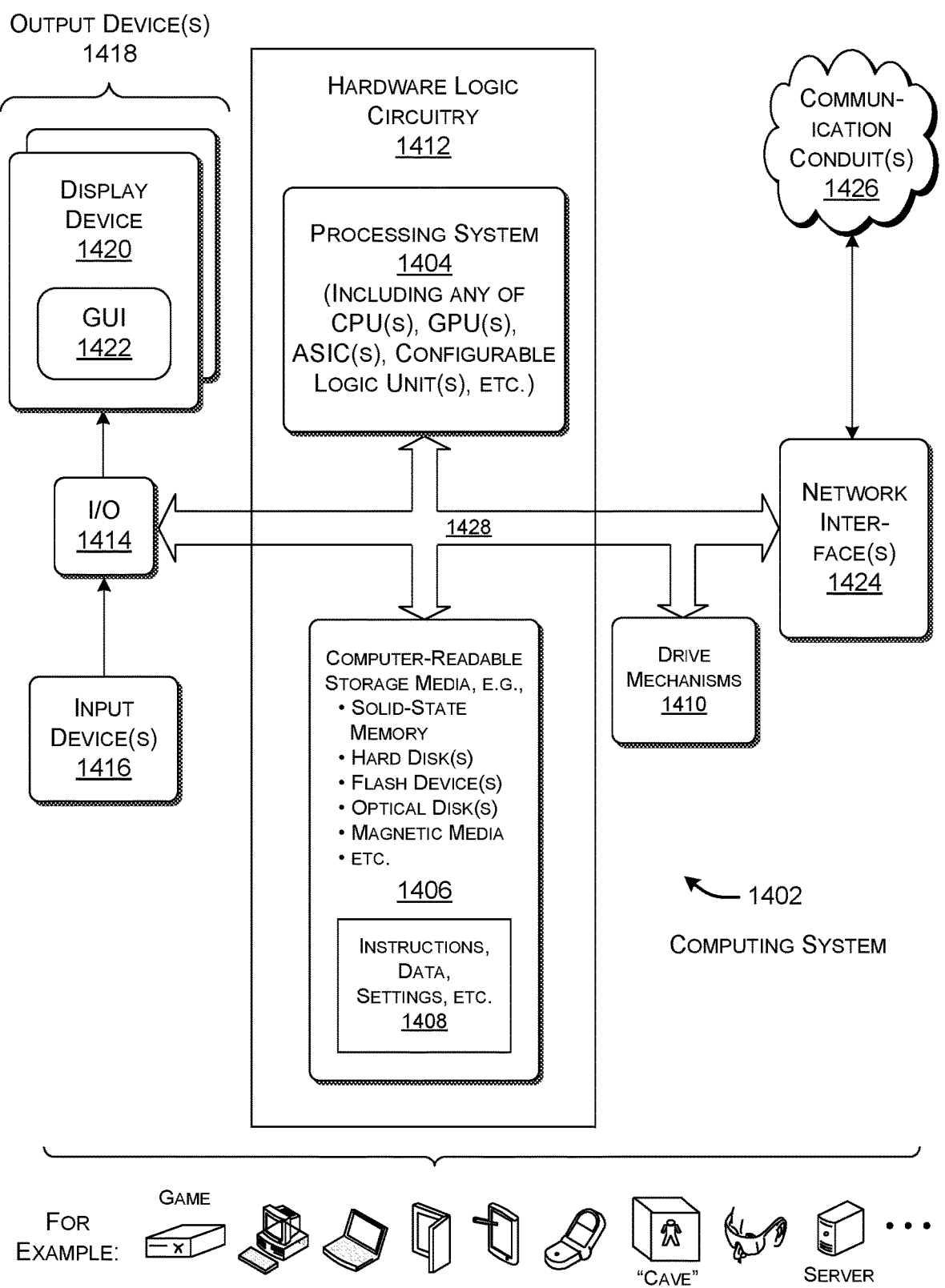
FIG. 14 shows an illustrative type of computing system that, in some implementations, is used to implement any aspect of the features shown in the foregoing drawings.

By way of terminology, a "machine-trained model" refers to computer-implemented logic for executing a task using machine-trained weights that are produced in a training operation. A "weight" refers to any type of parameter value that is iteratively produced by the training operation. A "token" refers to a unit of information processed by the machine-trained model, such as a word or a part of a word. In some cases, a tokenizer produces the tokens, but an item (e.g., a text passage) is said to be composed of tokens in a general sense (in which "token" is a synonym of "part"), irrespective of when and where those tokens are actually produced. An "embedding" is a distributed vector that represents an information item in a vector space. A "distributed vector," in turn, expresses the semantic content of an information item by distributing information over its k dimensions. A distributed vector is in contrast to a sparse one-hot vector that allocates particular dimensions of the vector to particular concepts. In some contexts, terms such as "component," "module," "engine," and "tool" refer to parts of computer-based technology that perform respective functions. FIGS. 13 and 14, described below, provide examples of illustrative computing equipment for performing these functions.

A target item contains a hallucination when it makes an assertion that it is not empirically supported by (or "entailed by") the evidence provided in the source item. In the context of FIG. 1, a hallucination is a computer-generated artifact in which a target part in the target item 106 makes an assertion that is not supported by the information conveyed by the source item 110. For example, a hallucination may represent a fabricated or "made up" fact. The transformation system 108 sometimes produces a hallucination as a result of misinterpreting the information in the source item 110, such as by inverting a relation stated in the source item 110. Alternatively, or in addition, the transformation system 108 produces a hallucination by extrapolating the information in a source item 110 based on its learned statistical patterns, but in a way that is not supported by the evidence in the source item 110 itself.

In some implementations, the support-assessing system 104 labels the target item 106 as hallucinated if at least one target part contains a hallucination. A false positive occurs when the support-assessing system 104 identifies the target item 106 as hallucinated when, in fact, it contains no hallucinations. A false negative occurs when the support-assessing system 104 identifies the target item 106 as free of hallucinations, when, in fact, it contains at least one hallucination.

The transformation system 108 produces the target item 106 in different ways in different environments by transforming the source item 110. In one application, the transformation system 108 is a computer-implemented abstractive summarization system. The abstractive summarization system produces a summary of the information in the source item 110. The summary constitutes the target item 106. In another application the transformation system 108 is a chat engine that produces a response to a user query by drawing on information conveyed by supplemental content. The query and the supplemental content serve as the source item 110, and the response is the target item 106. In other cases, the transformation system 108 is a natural language translation system, a style transformation system, etc.

In some implementations, the transformation system 108 is implemented using a machine-trained language model. In some cases, the language model operates in an auto-regressive manner, producing output information in token-by-token fashion. Further details regarding one implementation of such a language model is provided below in connection with the explanation of FIG. 9. As indicated there, the machine-trained model can be implemented as a transformer-based model, a convolutional neural network (CNN), a recurrent neural network (RNN), etc.

In some implementations, an item-generating application 116 produces the source item 110. For instance, the item-generating application 116 represents any one or more of a word processing application for producing text documents, a slide presentation system for producing slide decks, a dialogue system for producing dialogue transcripts, a meeting system for producing meeting transcripts, and so on. In other cases, the item-generating application 116 represents functionality for generating a set of training examples for eventual use in training a machined-trained model. In this context, the support-assessing system 104 plays the role of removing artifacts in the training examples. This "clean up" operation leads to the production of a more accurate machine-trained model.

By way of overview, the support-assessing system 104 determines whether each target part (e.g., target sentence) in the target item 106 has adequate support in the source item 110 by progressively expanding a scope of source content to be considered. In a first stage, the support-assessing system 104 determines whether the target part has support in any individual source part in the source item 110. If this test is not satisfied, the support-assessing system 104 forms a group that includes the two source parts that most closely match the target part. The support-assessing system 104 then determines whether the target part is supported by this group. If this test is not satisfied, the support-assessing system 104 forms a new group that includes the three source parts that most closely match the target part. This process continues until a group is found that provides support for the target part, or a maximum group size is reached (e.g., six source parts) without reaching a conclusion that the target part is supported. A target part that finds no support in the maximum-sized group is declared unsupported.

More specifically, a scope-selecting component 118 forms a group of g sentences, where g increases with each stage of analysis. It does so by using a similarity-assessing component 120 to determine a similarity score for each source part that conveys how similar that source part is to the target part under consideration. The scope-selecting component 118 then selects the g source parts that most closely match the target part. For instance, these g source parts are the source parts having the highest (most favorable) scores. The scope-selecting component 118 then concatenates the g source parts in the same order in which they appear in the source item 110. For example, for g=3, assume that the similarity-assessing component 120 determines that the fifth source sentence has the highest score, the second source sentence has the next highest score, and the seventh source sentence as the next highest score. The scope-selecting component 118 concatenates these sentences in a group that includes the second sentence, the fifth sentence, and the seventh sentence, in that order.

The similarity-assessing component 120 can determine similarity in various ways, such as by producing a term frequency-inverse document frequency (TF-IDF) score, an edit distance score, a semantic score, etc. The similarity-assessing component 120 performs TF-IDF analysis by measuring the frequency at which each word in the target part occurs in the group of source parts under consideration, divided by a measure of how common that term is within the source item 110 as a whole. The similarity-assessing component 120 then combines (e.g., sums) the scores for individual words in the target part to determine a final score for the target part as a whole. The similarity-assessing system 120 determines an edit distance by determining the number of operations that would be required to transform the target part into the group of source parts (e.g., as measured using the Levenshtein distance, longest common subsequence distance, or Hamming distance). The similarity-assessing component 120 generates a semantic score by mapping the target part into a first distributed vector, mapping the group of source parts into a second distributed vector, and then using any distance metric (such as cosine similarity) to determine the distance between these two vectors in a vector space. In other words, the semantic score represents a proximity of a vector representation of a given source part or parts (e.g., the second distributed vector) to a vector representation of a particular target part (e.g., the first distributed vector) in a vector space.

A scope-analyzing component 122 interacts with a natural language inference (NLI) system 124 in each stage to determine whether each target part is supported by a group of source parts under consideration. In one implementation, the NLI system 124 performs this task using a transformer-based machine-trained model that maps the target part and the selected source parts into a classification result. The classification result indicates whether: 1) the target part is supported by (entailed by) the source part(s); or 2) the target part is not supported by (entailed by) the source part(s); or 3) there is no strong evidence to suggest the target part is supported by or not supported by the source part(s). Additional details regarding this implementation are provided below in the context of the explanation of FIG. 9.

The NLI system 124 can use any other type of machine-trained classification system besides, or in addition to, a transformer-based machine-trained model, such as a CNN. Other approaches to inconsistency-checking include question-and-answer-generating (QAG) methods, parsing methods, etc. QAG methods generate questions based on a target item and/or a source item. The QAG methods then generate a first set of answers to the questions based on the source item, and a second set of answers to the questions based on the target item. The QG methods use the similarity between the two sets of answers as a measure of the consistency between the source item and the target item. Some parsing methods extract a first set of entities or entity relations from the source item, and a second set of entities or entity relations from the target item. These methods use the similarity between the two sets of extracted items as a measure of the consistency between the source item and the target item.

The support-assessing system 104 assigns labels to the target parts that identify whether they are supported or unsupported by the source item 110. A data store 126 stores a record of supported parts, while a data store 128 stores a record of unsupported parts. The support-assessing system 104 also assigns a label to the target item 106 as a whole to identify whether it is supported or unsupported by the source item 110. As stated above, in some implementations, a target item that includes at least one unsupported target part is considered unsupported as a whole. A "label" is intended to broadly identify any manner of tagging a part or item. The support-assessing system 104 can tag a part or item by attaching an identifier to it and/or by storing it in a data store having a particular designation. The support-assessing system 104 produces a final output result 130 that reflects whether or not the target item 106 is supported or unsupported. The final output result 130 also conveys the target part(s) that are determined to be unsupported (if any).

An action-taking component 132 performs one or more actions based on the final output result 130, depending on an application context in which the computing system 102 is used. In some implementations, the action-taking component 132 and the support-assessing system 104 are co-located. For instance, the action-taking component 132 is implemented by a same computing device(s) as the support-assessing system 104. Alternatively, the action-taking component 132 and the support-assessing system 102 are implemented by different computing devices (at least in part) provided at a same location or different respective locations.

In one implementation, the action-taking component 132 generates an output presentation that identifies each unsupported target item and its unsupported target parts. The output presentation can include an interface that enables a user to edit any target part(s), e.g., to remove and/or correct any unsupported facts contained therein. Alternatively, or in addition, the action-taking component 132 prompts the transformation system 108 to produce another target item, with the objective of producing a target item that does not contain any hallucinations. Alternatively, or in addition, the action-taking component 132 suspends any control action to be taken in a downstream system based on the target item 106.

Figure 2:
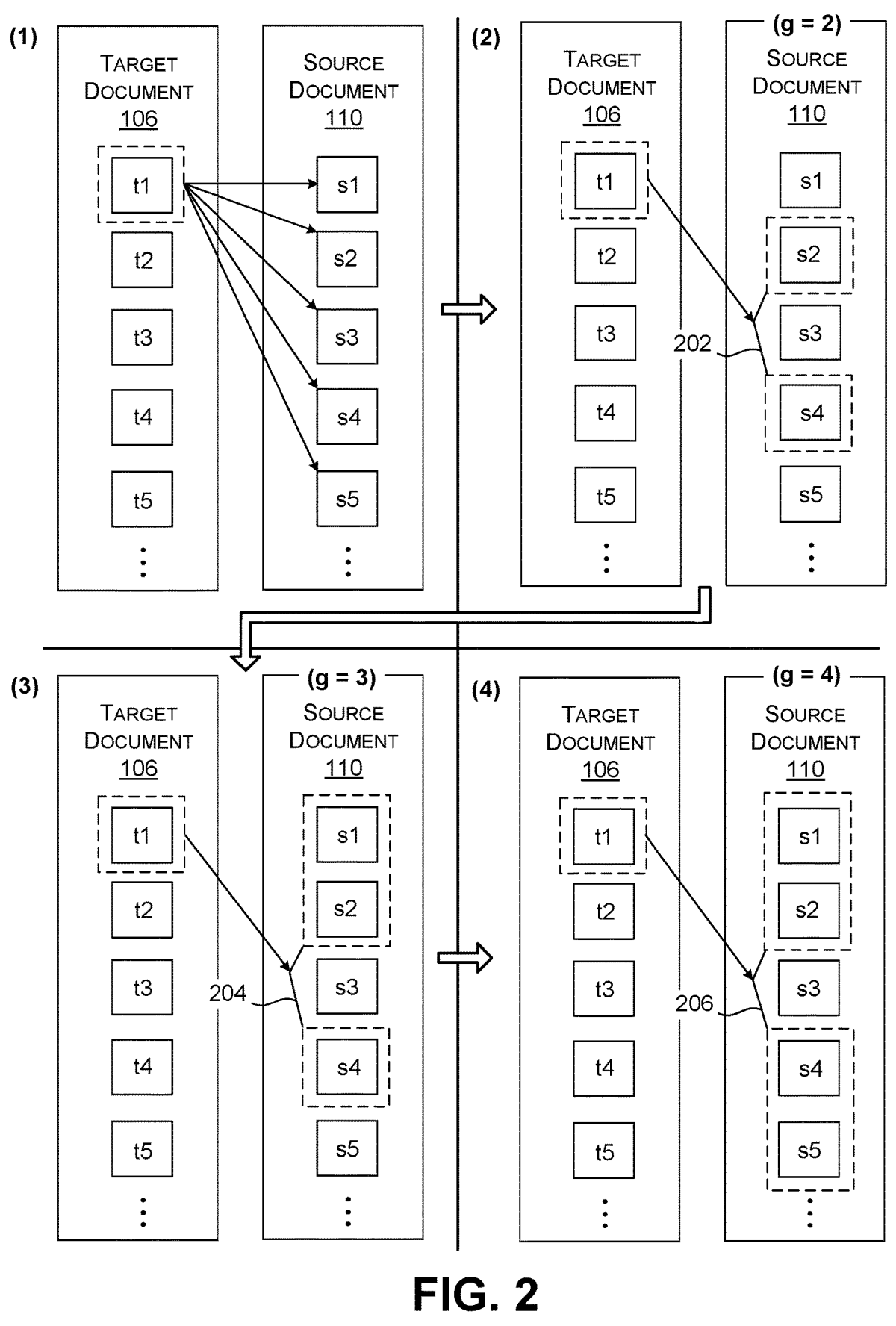

FIG. 2 shows an example of the progressive analysis performed by the support-assessing system 104 over four stages. The target item 106 includes target parts denoted by t1, t2, t3, etc. The source item 110 includes source parts denoted by s1, s2, s3, etc. A part refers to a sentence, dialogue turn, etc. FIG. 2 shows the case in which the support-assessing system 104 performs analysis for the first target part t1. Although not shown, the support-assessing system 104 performs analysis for each target part, e.g., in series and/or in parallel.

In a first stage (1), the support-assessing system 104 uses the NLI system 124 to determine whether the target part t1 has support in each individual source part. Assume that no individual source part provides support for the target part t1.

In a second stage (2), for a group size of g=2, the support-assessing system 104 uses the similarity-assessing component 120 to determine that the source parts s2 and s4 most closely match the target part t1. The support-assessing system 104 concatenates these source parts together to form a group 202. The support-assessing system 104 then uses the NLI system 124 to determine whether the target item t1 has support in the thus-formed group 202. Assume that this inquiry is answered in the negative.

In a third stage (3), for a group size of g=3, the support-assessing system 104 uses the similarity-assessing component 120 to determine that the source parts s1, s2, and s4 most closely match the target part t1. (Note, however, that the similarity-assessing component 120 need not re-compute the matching scores associated with the individual source parts, as this has already been performed in the second stage, and remains valid.) The support-assessing system 104 concatenates these source parts together to form a group 204. The support-assessing system 104 then uses the NLI system 124 to determine whether the target item t1 has support in the thus-formed group 204. Assume that this inquiry is answered in the negative.

In a fourth stage (4), for a group size of g=4, the support-assessing system 104 uses the similarity-assessing component 120 to determine that the source parts s1, s2, s4, and s5 most closely match the target part t1. The support-assessing system 104 concatenates these source parts together to form a group 206. The support-assessing system 104 then uses the NLI system 124 to determine whether the target item t1 has support in the thus-formed group 206. Assume that this inquiry is answered in the positive, upon which the support-assessing system 104 concludes that this target part t1 has support in the source item 110. If this were not the case, the support-assessing system would continue the above-described process, increasing the group size at each iteration by one source part until reaching an environment-specific maximum group size (e.g., six source parts).

FIG. 3 is a continuation of the example of FIG. 2, showing the information that is passed to the NLI system 124 at each stage of analysis (but omitting the first stage). In the second stage, the support-assessing system 104 forwards the target part t1 and the first group 202 that includes a concatenation of the source parts s2 and s4. In the third stage, the support-assessing system 104 forwards the target part t1 and the second group 204 that includes a concatenation of the source parts s1, s2, and s4. In the fourth stage, the support-assessing system 104 forwards the target part t1 and the third group 206 that includes a concatenation of the source parts s1, s2, s4, and s5. In each stage, the group includes source parts in the same order in which they appear in the source item 110. In some implementations, the support-assessing system 104 adopts a rule which interprets a classification of "neutral" by the NLI system 124 as an indication of no support.

For the special case of a dialogue transcript, in many cases, each dialogue turn is originally prefaced by the name of a person who is speaking in that turn. These prefatory tags can potentially bias the analysis performed by the NLI system 124 when interpreting a dialogue turn that mentions the name(s) of one or more participants in the body of the turn, e.g., as when one speaker says, "Frank: Should we speak with Bob and Sue about the licensing issues?" The NLI system 124 will be improperly influenced by a dialogue turn which is preceded by the name "Sue" or "Bob." To address this risk, the scope-analyzing component 122 appends a list of participants of the meeting to each turn of the dialogue. This has the effect of essentially desensitizing the NLI system 124 to name information that precedes the dialogue turns, and thereby reducing the bias caused by the above special case. Another way of reducing bias in a dialogue transcript is to remove all names associated with participants of the dialogue.

FIG. 4 shows an output presentation 402 produced by the action-taking component 132 for presentation on any type of display device. The output presentation 402 includes a first section 404 that displays a target item, including its various target parts. The first section 404 highlights those target part(s) (if any) that have been flagged as unsupported. Here, the action-taking component 132 highlights two target parts (406, 408) that are unsupported using bolding, underlining, etc. More generally, the action-taking component 132 can use any technique to flag the existence of unsupported target parts, such as by attaching explanatory annotations to the unsupported target parts. The output presentation 402 includes an editable interface that allows a user to edit any target part, e.g., within the first section 404 and/or within a separate second section 410.

FIG. 5 shows an implementation in which the action-taking component 132 uses the output results produced by the support-assessing system to control any downstream system 502 or environment. In one application, for example, assume that the transformation system 108 summarizes full-length news stories. Further assume that the action-taking component 132 automatically posts the summaries to a news website. Here, the action-taking component 132 prevents a news summary that contains hallucinations from being posted in unmodified form to the website.

In another application, the transformation system 108 generates summaries of transcripts of meetings held in a company via a video conferencing application. The action-taking component 132 automatically forwards summaries of meetings to individuals who attended the meetings and/or other need-to-know individuals. The action-taking component 132 prevents a meeting summary that contains hallucinations from being transmitted to users or otherwise accessed users in unmodified form.

In another application, the transformation system 108 produces summaries of information collected in a policing context or an emergency response context. The action-taking component 132 automatically distributes the summaries to selected need-to-know individuals, such as first responders. Alternatively, or in addition, the action-taking component 132 automatically controls any kind of physical security-related system based on the generated summaries, e.g., by sounding an alarm, closing a gate, locking a door, disabling a computer system, or shutting off power. In so doing, the action-taking component 132 prevents a summary that contains hallucinations from being sent to users in unmodified form, or changing the state of a physical system.

In general, the above three examples perform control actions which prevent the dissemination of factually impaired computer-generated content. This action reduces the chances that the computing system 102 will deliver information that misguides human users, or causes incorrect control actions to be taken. Different implementations of the action-taking component 132 can implement a blocking action in different ways, such as by adding an attribute to a faulty target item, and/or storing the target item in a location associated with faulty target items. A distribution system is configured to transfer a computer-generated target item to a target destination, subject to a determination that the target item has not been flagged as faulty in any of the above ways. The above-described blocking and distributing functions can be performed by a server-side service and/or as a program that runs on individual user computing devices.

In another environment, the action-taking component 132 requests the transformation system 108 to generate another target item, given different input conditions. Some generative machine-trained models, for instance, will produce a different target item given a new randomly-selected seed item.

In another environment, the action-taking component 132 changes the operation of the transformation system 108 itself based on the output results of the support-assessing 104. For example, assume that the action-taking component 132 determines that more than a prescribed percentage of target items contain hallucinations. The action-taking component 132 responds by changing one or more settings of the transformation system 108. For example, assume that the transformation system 108 is implemented using a machine-trained model that generates text based on or more threshold levels (e.g., confidence levels and/or vector-space distance measures). In some implementations, the action-taking component 132 modifies the level(s) to reduce the extent to which the machine-trained model is permitted to stray from the given text of the source item 110.

The above examples are illustrative. Other environments leverage the output results of the support-assessing system 104 to control yet other processes and systems.

Figure 6:
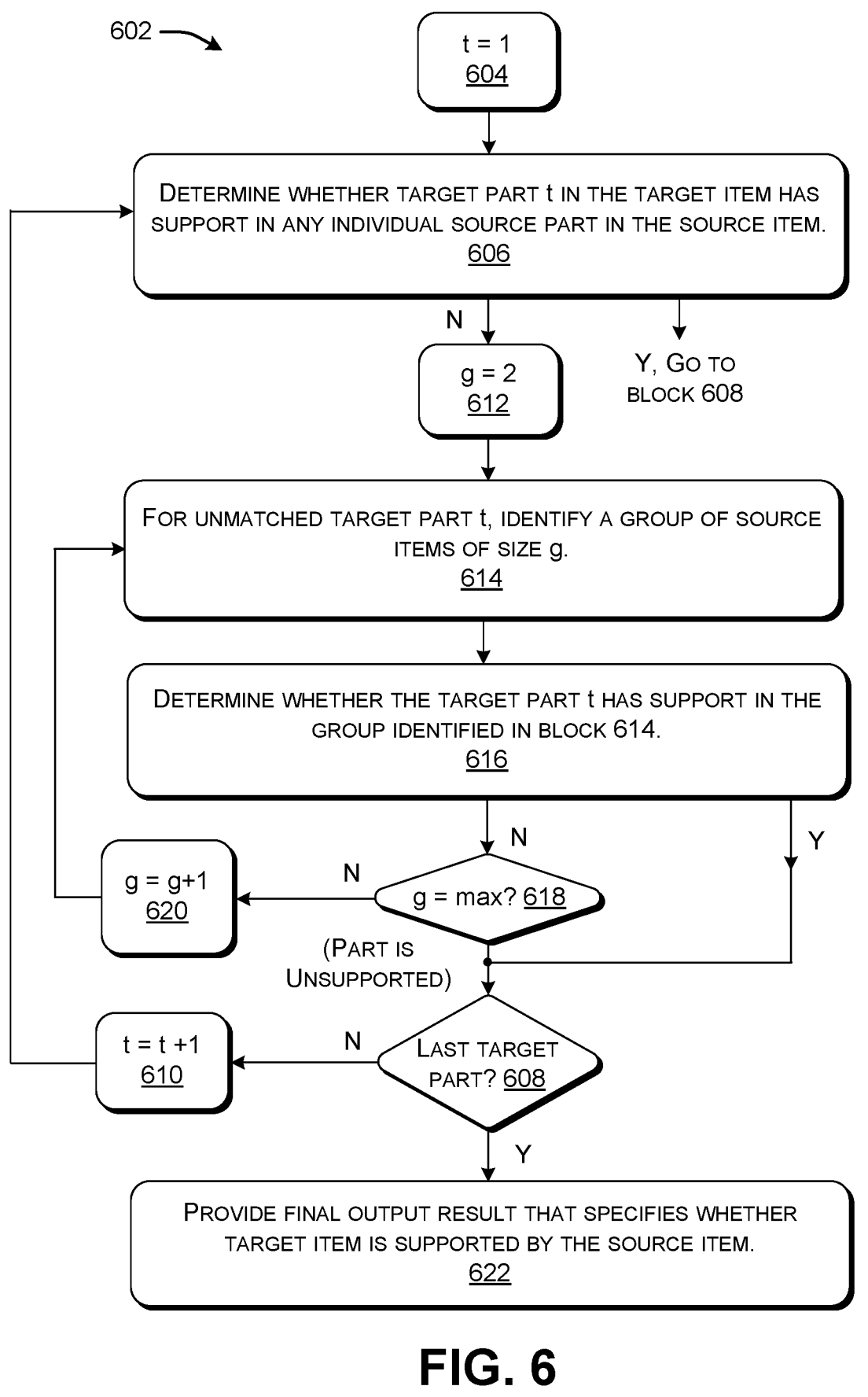

FIG. 6 shows a process 602 that explains one manner of operation of the support-assessing system 104. A computing device can perform this process 602 by executed a computer program. Note that FIG. 6 shows the case in which the support-assessing system 104 performs actions in series. Alternatively, or in addition, any implementation can parallelize the operations shown in FIG. 6 in various respects, such as by performing processing on different target parts in parallel.

In block 604, the support-assessing system 104 sets a target item index to 1. In block 606, the support-assessing system 104 determines whether the target part under consideration (initially t1) has support in any individual source part in the source item 110. In block 606 is answered in the affirmative (Y), then the process flow advances to block 608. There, the support-assessing system 104 determines whether the last target part has been analyzed. If not, in block 610, the support-assessing system 104 advances to a next target item (t2), and returns to block 606.

Alternatively, if block 606 is answered in the negative (N), then the support-assessing system 104 begins it progressive analyses of groups of increasing size. More specifically, in block 612, the support-assessing system 104 sets an initial group size g to 2 source parts. In block 614, the support-assessing system 104 forms a group that contains g source parts, e.g., by using the similarity-assessing component 120 to identify the g source parts that are most relevant to the target item under consideration, and then concatenating the source parts together in the same order in which they appear in the source item 110. In block 616, the support-assessing system 104 determines whether the particular target part is supported in the group formed in block 614. If so, then the process flow advances to blocks 608 and 610, in which the support-assessing system 104 moves on to the next target part, if any.

If, on the other hand, the target part does not find support in the group, then, in block 618, the support-assessing system 104 determines whether the group size has already reached its maximum size (e.g., 6 source parts). If so, then the target part is given a final label of "unsupported," and the process flow advances to block 608. If the maximum size has not been reached, then, in block 620, the support-assessing system 104 increments the group size by 1 and returns to block 614 to repeat the analysis for this new group, now having three source parts.

Assume that, in block 608, the support-assessing system 104 concludes that the last target item has been analyzed. Then, in block 622, the support-assessing system 104 provides a final assessment of whether the target item 106 is supported by the source item 110. In some implementations, a target item 106 is considered unsupported if at least one target part has been found to be unsupported.

As described above, the analysis of FIG. 6 is performed for individual target parts (e.g., individual target sentences) of the target item 106, e.g., by performing analysis on target part t1, and then target part t2, and then target part t3, etc. In another case, the support-assessing system 104 repeats the above-described analysis for groups of target parts. For example, the analysis can be performed for a combination of target parts t1+t2, for a combination of target parts t2+t3, for a combination of target parts t3+t4, and so on. Still other ways of clustering the target parts and/or the source parts are possible FIG. 7 shows the case in which the support-assessing system 104 is part of the transformation system 108 itself. In some cases, the transformation system 108 uses the support-assessing system 104 to identify hallucinations in a target item while the target item is being produced. For example, the transformation system 108 can invoke the support-assessing system 104 after a prescribed number of tokens have been generated. In response to detecting a hallucination, the transformation system 108 can take any environment-specification action, such as by repeating the generation of the defective portion of the target item using different input conditions, or removing the defective portion.

In addition, or alternatively, the support-assessing system 104 identifies hallucinations during the creation of the source item 110. Consider, for instance, the case in which a dialogue system produces new transcript content on a periodic basis during the course of a dialogue. Further assume that the dialogue system invokes the transformation system 108 to convert each instance of new transcript content into summary content, e.g., as soon as each instance of new transcript content is produced. Here, the support-assessing system 104 can be said to detect hallucinations in the summary item in dynamic or real-time fashion during the production of the transcript (and during the course of the dialogue itself). Further, the action-taking component 132 can perform actions in the course of the production of the source item 110 and/or the target item 106, e.g., by displaying the summary as the summary is being produced, or taking any control action as the summary is being produced.

FIG. 8 shows tests results that compare the performance of the technique of FIG. 1 with two alternative techniques. A first alternative test ("NLI-Full-Doc") determines the relevance of the target item by holistically examining the entire source item. A second alternative test ("NLI-Per-Sent") compares individual sentences in the target item with individual sentences in the source item. FIG. 8 shows the results for four different test runs. The first two test runs are performed on document summaries. The last two test runs are performed on meeting summaries. Each result in the chart specifies the success of a particular technique in identifying hallucinations in the summary, as measured against ground-truth results generated by human reviewers.

As indicated in FIG. 8, the technique used by the computing system of FIG. 1 provides superior results for all test runs compared to the other two techniques. The technique of FIG. 1 performs better than the NLI-Per-Sent technique because this alternative technique misses those cases in which the meaning of a target part is attributed to information distributed over two or more source parts. The technique of FIG. 1 performs better than the NLI-Full-Doc technique because the scope of analysis in this alternative case obscures the relation between any given target part and particular portions of the source item. Discrepancies between training examples and inference-stage examples may also impair the quality of the NLI-Full-Doc technique.

Note that the technique in FIG. 1 does not necessarily run in less time than other techniques. But the other techniques produce more hallucinations compared to the technique of FIG. 1, which, in turn, requires a user to manually correct or otherwise addresses these errors. When all of the costs involved in the generation and correction of summaries are taken into account, the technique shown in FIG. 1 is a time-efficient and resource-efficient process for producing summaries (and other types of document transformations). For example, the technique shown in FIG. 1 eliminates or reduces the need for the user to interact with a word processing application to manually edit a faulty summary. In doing so, the technique reduces the amount of time that is needed to produce an acceptable summary, and also reduces the use of computer-related resources (which are needed to run the word processing application). These computer-related resources include memory resources and processor-related resources.

Further note that the support-assessing system 104 uses a technique that is agnostic to the type of source item that is input to the computing system 102 (in the sense that the support-assessing system 104 can be applied to many different types of source items). The support-assessing system 102 also performs its support-checking function in a manner that not dependent on particular text-parsing rules, such as particular grammatical rules. These aspects allow the computing system 102 to function as a scalable and low-maintenance tool that can be applied to many different environments without revision (or with minimal revision). Reducing the need for revision and maintenance reduces development time and the use of computer-related resources.

FIG. 9 shows a transformer-based language model ("language model") 902 for implementing one or more functions of the computing system 102 of FIG. 1. More specifically, in some implementations, the language model 902 is used to implement the transformation system 108. Alternatively, or in addition, the language model 902 is used to implement the NLI system 124. The following explanation first describes the language model 902 in general terms, and then describes the application of the language model to different functions of the computing system 102 of FIG. 1.

The language model 902 is composed, in part, of a pipeline of transformer components, including a first transformer component 904. FIG. 9 provides details regarding one way to implement the first transformer component 904. Although not specifically illustrated, other transformer components of the language model 902 have the same architecture and perform the same functions as the first transformer component 904 (but are governed by separate sets of weights).

The language model 902 commences its operation with the receipt of input information, such as a passage of text. The prompt includes a series of linguistic tokens. In some examples, a "token" refers to a unit of text having any granularity, such as an individual word, a word fragment produced by byte pair encoding (BPE), a character n-gram, a word fragment identified by the WordPiece or Sentence-Piece algorithm, etc. To facilitate explanation, assume that each token corresponds to a complete word. The principles set forth herein, however, are not limited to the processing of text information; in other examples, the language model 902 operates on any of: audio information, image information, video information, sensor information, and so on, or any combination thereof.

Next, an embedding component (not shown) maps the sequence of tokens into respective token embeddings. For example, the embedding component can produce one-hot vectors that describe the tokens, and can then map the one-hot vectors into the token embeddings using a machine-trained linear transformation. The embedding component then adds position information (and, in some cases, segment information) to the respective token embeddings to produce position-supplemented embedding vectors 906. The position information added to each token embedding describes the embedding vector's position in the sequence of token embeddings.

The first transformer component 904 operates on the position-supplemented embedding vectors 906. In some implementations, the first transformer component 904 includes, in order, an attention component 908, a first add-and-normalize component 910, a feed-forward neural network (FFN) component 912, and a second add-and-normalize component 914.

The attention component 908 determines how much emphasis should be placed on parts of input information when interpreting other parts of the input information. Consider, for example, a sentence that reads: "I asked the professor a question, but he could not answer it." When interpreting the word "it," the attention component 908 will determine how much weight or emphasis should be placed on each of the words of the sentence. The attention component 908 will find that that the word "question" is most significant.

The attention component 908 performs attention analysis using the following equation:

$$\text{Attention}(Q, K, V) = \text{softmax}\left(\frac{QK^T}{\sqrt{d_k}}\right)V. \tag{1}$$

The attention component 908 produces query information Q by multiplying the position-supplemented embedding vectors 946 by a query weighting matrix $W^Q$. Similarly, the attention component 908 produces key information K and value information V by multiplying the position-supplemented embedding vectors 906 by a key weighting matrix $W^K$ and a value weighting matrix $W^V$, respectively. To execute Equation (1), the attention component 908 takes the dot product of Q with the transpose of K, and then divides the dot product by a scaling factor $\sqrt{d}$, to produce a scaled result The symbol d represents the dimensionality of Q and K. The attention component 908 takes the Softmax (normalized exponential function) of the scaled result, and then multiplies the result of the Softmax operation by V, to produce attention output information. More generally stated, the attention component 908 determines how much emphasis should be placed on each part of input embedding information when interpreting other parts of the input embedding information, and when interpreting the same part. In some cases, the attention component 908 is said to perform masked attention insofar as the attention component 908 masks output token information that, at any given time, has not yet been determined. Background information regarding the general concept of attention is provided in Vaswani, et al., "Attention Is All You Need," in 31st Conference on Neural Information Processing Systems (NIPS 2017), 2017, 9 pages.

Note that FIG. 9 shows that the attention component 908 is composed of plural attention heads, including a representative attention head 916. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 908 concatenates the output results of the attention component's separate attention heads, and then multiplies the results of this concatenation by another weight matrix $W^{\circ}$.

The add-and-normalize component 910 includes a residual connection that combines (e.g., sums) input information fed to the attention component 908 with the output information generated by the attention component 908. The add-and-normalize component 910 then normalizes the output information generated by the residual connection, e.g., by layer-normalizing values in the output information based on the mean and standard deviation of those values, or by performing root-mean-squared normalization. The other add-and-normalize component 914 performs the same functions as the first-mentioned add-and-normalize component 910. The FFN component 912 transforms input information to output information using a feed-forward neural network having any number of layers.

The first transformer component 904 produces output embedding information 918. A series of other transformer components (920, . . . , 922) perform the same functions as the first transformer component 904, each operating on output embedding information produced by its immediately preceding transformer component. Each transformer component uses its own level-specific set of machine-trained weights. The final transformer component 922 in the language model 902 produces final output embedding information 924.

In some implementations, a post-processing component 926 performs post-processing operations on the final output embedding information 924. For example, the post-processing component 926 performs a machine-trained linear transformation on the final output embedding information 924, and processes the results of this transformation using a Softmax component (not shown). The language model 902 uses the output of the post-processing component 926 to predict the next token in the input sequence of tokens. In some applications, the language model 902 performs this task using a greedy selection approach (e.g., by selecting the token having the highest probability), or by using the beam search algorithm (e.g., by traversing a tree that expresses a search space of candidate next tokens).

In other implementations, the post-processing component 926 represents a classification component, e.g., implemented using a fully-connected feed-forward neural network having one or more layers.

In some implementations, the language model 902 operates in an auto-regressive manner, as indicated by the loop 928. To operate in this way, the language model 902 appends a predicted token to the end of the sequence of input tokens, to provide an updated sequence of tokens. The predicted token leads to the production of a new position-supplemented vector 930. In a next pass, the language model 902 processes the updated sequence of position-supplemented vectors to generate a next predicted token. The language model 902 repeats the above process until it generates a specified stop token.

The above-described implementation of the language model 902 relies on a decoder-only architecture. Other implementations of the language model 902 use an encoder-decoder transformer-based architecture. Here, a transformer-based decoder receives encoder output information produced by a transformer-based encoder, together with decoder input information.

In some implementations, the language model 902 is trained by fine-tuning a pre-trained language model. One example of publicly-available pre-trained language model is described in Touvron, et al., "LLaMA: Open and Efficient Foundation Language Models," arXiv, arXiv: 2302.13971v1 [cs. CL], Feb. 27, 2023, 27 pages. Another example of a publicly-available pre-trained model language model is the BLOOM model described in Scao, et al., "BLOOM: A 176B-Parameter Open-Access Multilingual Language Model," arXiv, arXiv: 2211.05100v2 [cs. CL], Dec. 11, 2022, 62 pages. In some examples, the pre-training of a generative language model includes unsupervised training using language modeling (e.g., predicting the next word in a given text passage and comparing the prediction with the actual next word) and supervised training (e.g., predicting an output result and comparing the prediction with a ground-truth result). Background on the general task of pre-training generative language models is provided in Radford, et al., "Improving Language Understanding by Generative Pre-training," OpenAI, San Francisco California, Jun. 11, 2018, 12 pages.

Other implementations of the language model 902 use other kinds of machine-trained models besides, or in addition to, the particular transformer-based architecture shown in FIG. 9. The other machine-trained models include any of CNNs, RNNs, fully-connected feed-forward neural networks (FFNS), stable diffusion models, etc., or any combination thereof.

In a first application, the transformation system 108 performs abstractive summarization using the language model 902. Here, the input text fed to the language model 902 is the source item 110. The language model 902 generates the target item 106 in token-by-token fashion in the manner described above. The language model 902 is specifically trained to produce tokens that summarize the information in the source item 110. A training set for this training includes a set of original documents and a set of ground-truth summaries for those documents.

In a second application, the transformation system 108 is a chat engine that uses the language model 902 to generate responses to questions posed by users, subject to the constraint that the answers contain information that is derivable from specified supplemental content. For example, assume that the user's question is "What is the relation of the man and woman discussed in this article <article>," and the supplemental content is the referenced article. The source item 110 can be considered the query in combination with the supplemental content. The target item 106 is the response produced by the chat engine. The language model 902 generates the target item in token-by-token fashion in the manner described above.

In a third application, the NLI system 124 uses the language model 902 to assess whether a given target part has support in a portion having a scope of one or more source parts. Here, the language model 902 receives a string of text tokens that concatenates the target part with the source part(s). The post-processing component 926 includes a classification component that produces a classification result which indicates whether the target part is supported by the source part(s).

In one particular implementation, the input tokens fed to the language model 902 includes a special introductory classification [CLS] token. The transformation components of the language model 902 transform the [CLS] token to a classification embedding that encapsulates information about both the target item and the source part(s). The post-processing component 826 transforms the classification embedding into a classification result. Each of the training examples used to train the language model 902 for the above role include a target part, a source portion, and a ground-truth classification result. An example of a publicly available language model that is suitable for use in natural language inference in the above-indicated manner is the BERT model described in Devlin, et al., "BERT: Pre-training of Deep Bidirectional Transformers for Language Understanding," arXiv, arXiv: 1810.04805v2 [cs.CL], May 24, 2019, 16 pages.

FIGS. 10-12 show three processes that represent an overview of the operation of the computing system of FIG. 1. Each of the processes is expressed as a series of operations performed in a particular order. But the order of these operations is merely representative, and the operations are capable of being varied in other implementations. Further, any two or more operations described below can be performed in a parallel manner. In one implementation, the blocks shown in the processes that pertain to processing-related functions are implemented by the computing equipment described in connection with FIGS. 13 and 14.

More specifically, FIG. 10 shows a process 1002 that represents an overview of one manner of operation of the support-assessing system 104 of FIG. 1. In block 1004, the support-assessing system 104 receives a source item (e.g., the source item 110), the source item having plural source parts. In block 1006, the support-assessing system 104 receives a target item (e.g., the target item 106), the target item having plural target parts. The target item is produced by transforming the source item into the target item using a computer-implemented transformation system (e.g., the transformation system 108). In block 1008, the support-assessing system 104 determines whether the target parts in the target item are supported by the source item using an analysis process. In block 1010, the support-assessing system 104 assigns a label to the target item based on an outcome of the determining, the label indicating whether the target parts are supported by the source item. In block 1012, the support-assessing system 104 performs an action based on the label.

FIG. 11 shows a process 1102 that provides further illustrative details regarding operation 1008 of FIG. 10. In block 1104, the support-assessing system 104 determines whether a particular target part is supported by any individual source part using a computer-implemented natural language interface (NLI) system (e.g., the NLI system 124). In block 1106, upon determining that the particular target part is not supported by any source part, the support-assessing system 104 forms a pairing of the particular target part and a portion of the source item, the portion of the source item being of a particular size that includes at least two source parts. In block 1108, the support-assessing system 104 determines whether the particular target part is supported by the portion of the source item using the NLI system. In block 1110, the support-assessing system 104 increases a size of the portion of the source item upon concluding that the particular target part is unsupported by the current portion of the source item. The loop 1112 indicates that the support-assessing system 104 repeats blocks 1106, 1108, and 1110 until it is determined that the particular target part is supported, or until it is determined that a maximum size of the portion of the source item has been reached and the particular target part remains unsupported.

FIG. 12 shows a process 1202 that provides further illustrative details regarding the operation of block 1106 of FIG. 11. In block 1204, the support-assessing system 104 selects a group of particular source parts that most closely match the particular target part, the group having a predetermined number of source parts. In block 1206, the support-assessing system 104 concatenates the particular source parts in an order that matches an order in which the particular source parts appear in the source item.

FIG. 13 shows computing equipment 1302 that, in some implementations, is used to implement the computing system 102. The computing equipment 1302 includes a set of local devices 1304 coupled to a set of servers 1306 via a computer network 1308. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 1308 is implemented as a local area network, a wide area network (e.g., the Internet), one or more point-to-point links, or any combination thereof.

The bottom-most overlapping box in FIG. 13 indicates that the functionality of the computing system 102 is capable of being spread across the local devices 1304 and/or the servers 1306 in any manner. In one example, the computing system 102 is entirely implemented by a local device or the servers 1306. In another example, the computing system 102 is entirely implemented by a local device. In other cases, some of the functions of the computing system 102 are implemented by a local device, and other functions of the computing system 102 are implemented by the servers 1306. For example, the resource-intensive operations of the transformation system 108 and/or the NLI system 124 are implemented by the servers 1306, and the remainder of the functions of FIG. 1 are performed by each local device.

FIG. 14 shows a computing system 1402 that, in some implementations, is used to implement any aspect of the mechanisms set forth in the above-described figures. For instance, in some implementations, the type of computing system 1402 shown in FIG. 14 is used to implement any local computing device or any server shown in FIG. 13. In all cases, the computing system 1402 represents a physical and tangible processing mechanism.

The computing system 1402 includes a processing system 1404 including one or more processors. The processor(s) include one or more central processing units (CPUs), and/or one or more graphics processing units (GPUs), and/or one or more application specific integrated circuits (ASICs), and/or one or more neural processing units (NPUs), and/or one or more tensor processing units (TPUs), etc. More generally, any processor corresponds to a general-purpose processing unit or an application-specific processor unit.

The computing system 1402 also includes computer-readable storage media 1406, corresponding to one or more computer-readable media hardware units. The computer-readable storage media 1406 retains any kind of information 1408, such as machine-readable instructions, settings, model weights, and/or other data. In some implementations, the computer-readable storage media 1406 includes one or more solid-state devices, one or more magnetic hard disks, one or more optical disks, magnetic tape, etc. Any instance of the computer-readable storage media 1406 uses any technology for storing and retrieving information. Further, any instance of the computer-readable storage media 1406 represents a fixed or removable unit of the computing system 1402. Further, any instance of the computer-readable storage media 1406 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 1402 utilizes any instance of the computer-readable storage media 1406 in different ways. For example, in some implementations, any instance of the computer-readable storage media 1406 represents a hardware memory unit (such as random access memory (RAM)) for storing information during execution of a program by the computing system 1402, and/or a hardware storage unit (such as a hard disk) for retaining/archiving information on a more permanent basis. In the latter case, the computing system 1402 also includes one or more drive mechanisms 1410 (such as a hard drive mechanism) for storing and retrieving information from an instance of the computer-readable storage media 1406.

In some implementations, the computing system 1402 performs any of the functions described above when the processing system 1404 executes computer-readable instructions stored in any instance of the computer-readable storage media 1406. For instance, in some implementations, the computing system 1402 carries out computer-readable instructions to perform each block of the processes described with reference to FIGS. 10-12. FIG. 14 generally indicates that hardware logic circuitry 1412 includes any combination of the processing system 1404 and the computer-readable storage media 1406.

In addition, or alternatively, the processing system 1404 includes one or more other configurable logic units that perform operations using a collection of logic gates. For instance, in some implementations, the processing system 1404 includes a fixed configuration of hardware logic gates, e.g., that are created and set at the time of manufacture, and thereafter unalterable. In addition, or alternatively, the processing system 1404 includes a collection of programmable hardware logic gates that are set to perform different application-specific tasks. The latter category of devices includes programmable array logic devices (PALs), generic array logic devices (GALs), complex programmable logic devices (CPLDs), field-programmable gate arrays (FPGAs), etc. In these implementations, the processing system 1404 effectively incorporates a storage device that stores computer-readable instructions, insofar as the configurable logic units are configured to execute the instructions and therefore embody or store these instructions.

In some cases (e.g., in the case in which the computing system 1402 represents a user computing device), the computing system 1402 also includes an input/output interface 1414 for receiving various inputs (via input devices 1416), and for providing various outputs (via output devices 1418). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1420 and an associated graphical user interface presentation (GUI) 1422. The display device 1420 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1402 also includes one or more network interfaces 1424 for exchanging data with other devices via one or more communication conduits 1426. One or more communication buses 1428 communicatively couple the above-described units together.

The communication conduit(s) 1426 is implemented in any manner, e.g., by a local area computer network, a wide area computer network (e.g., the Internet), point-to-point connections, or any combination thereof. The communication conduit(s) 1426 include any combination of hardwired links, wireless links, routers, gateway functionality, name servers, etc., governed by any protocol or combination of protocols.

FIG. 14 shows the computing system 1402 as being composed of a discrete collection of separate units. In some cases, the collection of units corresponds to discrete hardware units provided in a computing device chassis having any form factor. FIG. 14 shows illustrative form factors in its bottom portion. In other cases, the computing system 1402 includes a hardware logic unit that integrates the functions of two or more of the units shown in FIG. 14. For instance, in some implementations, the computing system 1402 includes a system on a chip (SoC or SOC), corresponding to an integrated circuit that combines the functions of two or more of the units shown in FIG. 14.

The following summary provides a set of illustrative examples of the technology set forth herein.

(A1) According to one aspect, a method (e.g., the process 1002) is described for determining whether a target item (e.g., the target item 106) is supported by a source item (e.g., the source item 112). The method includes: receiving (e.g., in block 1004) the source item, the source item having plural source parts; receiving (e.g., in block 1006) the target item, the target item having plural target parts, the target item being produced by transforming the source item into the target item using a computer-implemented transformation system (e.g., the transformation system 108); determining (e.g., in block 1008) whether the target parts in the target item are supported by the source item using an analysis process; assigning (e.g., in block 1010) a label to the target item based on an outcome of the determining, the label indicating whether the target parts are supported by the source item; and performing (e.g., in block 1012) an action based on the label.

In some implementations, the analysis process includes logic for progressively expanding a scope of source content to be considered when analyzing whether a particular target item is supported by the source item. In some implementations, the analysis process is more specifically implemented by logic which operates by: determining (e.g., in block 1104) whether a particular target part is supported by any indivual source part using a computer-implemented natural language interface (NLI) system (e.g., the NLI system 124); upon determining that the particular target part is not supported by any source part, forming (e.g., in block 1106) a pairing of the particular target part and a portion of the source item, the portion of the source item being of a particular size that includes at least two source parts; determining (e.g., in block 1108) whether the particular target part is supported by the portion of the source item using the NLI system; increasing (e.g., in block 1110) a size of the portion of the source item upon concluding that the particular target part is unsupported by the portion of the source item; and repeating (e.g., as conveyed by loop 1112) the forming, determining whether the particular target part is supported by the portion of the source item, and increasing until it is determined that the particular target part is supported, or until it is determined that a maximum size of the portion of the source item has been reached and the particular target part remains unsupported.

(A2) According to some implementations of the method of A1, the source item is a source document, and the plural source parts are plural source sentences in the source document. The target item is a target document, and a particular target part of the plural target parts is a target sentence in the target document.

(A3) According to some implementations of the method of A1, the source item is a dialogue captured by a dialogue system or a meeting system having plural dialogue turns, and each source part of the source item is a dialogue turn.

(A4) According to some implementations of any of the methods of A1-A3, the computer-implemented transformation system is a computer-implemented summarization system, the target item being a summary of the source item generated by the computer-implemented summarization system.

(A5) According to some implementations of any of the methods of A1-A3, the computer-implemented transformation system is a chat engine, the target item being a response to an input query produced by the chat engine.

(A6) According to some implementations of any of the methods of A1-A5, the NLI system uses a machine-trained classification model that classifies an instance of target content as supported or unsupported by an instance of source content.

(A7) According to some implementations of any of the methods of A1-A6, the operation of determining whether the target parts in the target item are supported by the source item occurs during a process of creation of the source item and/or a process of producing the target item by the computer-implemented transformation system.

(A8) According to some implementations of any of the methods of A1-A7, the forming produces the portion of the source item by: selecting a group of particular source parts that most closely match the particular target part, the group having a predetermined number of source parts; and concatenating the particular source parts in an order that matches an order in which the particular source parts appear in the source item.

(A9) According to some implementations of the method of A8, the selecting uses a term frequency-inverse document frequency score and/or a semantic score to determine an extent to which a given source part matches the particular target part.

(A10) According to some implementations of any of the method of A9, the semantic score measures a proximity of a vector representation of the given source part to a vector representation of the particular target part in a vector space.

(A11) According to some implementations of any of the methods of A1-A10, the action includes generating an output presentation that identifies any target parts of the plural target parts that are not supported by the source item.

(A12) According to some implementations of any of the methods of A1-A11, the action includes generating at least one other target item using the transformation component, until a target item is generated that is supported by the source item.

(A13) According to some implementations of any of the methods of A1-A12, the action includes automatically removing any target part that has been identified as unsupported by the source item.

(A14) According to some implementations of any of the methods of A1-A13, the action includes preventing transfer of the target item to a target destination upon determining that the target item is not supported by the source item.

(A15) According to some implementations of the method of A14, the source item is a dialogue transcript, and the target item is a summary of the dialogue transcript. The operation of preventing includes preventing a distribution system from distributing the summary when the summary is not supported by the dialogue transcript.

(A16) According to some implementations of any of the methods of A1-A15, the action includes suspending or revising an automated control action, upon a finding that the target item is unsupported by the source item, the control action controlling a state of a physical system, such as a security-related system.

In yet another aspect, some implementations of the technology described herein include a computing system (e.g., the computing system 1402) that includes a processing system (e.g., the processing system 1404) having a processor. The computing system also includes a storage device (e.g., the computer-readable storage media 1406) for storing computer-readable instructions (e.g., information 1408). The processing system executes the computer-readable instructions to perform any of the methods described herein (e.g., any individual method of the methods of A1-A16).

In yet another aspect, some implementations of the technology described herein include a computer-readable storage medium (e.g., the computer-readable storage media 1406) for storing computer-readable instructions (e.g., the information 1408). A processing system (e.g., the processing system 1404) executes the computer-readable instructions to perform any of the operations described herein (e.g., the operations in any individual method of the methods of A1-A16).

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1412 of FIG. 14. The term "logic" likewise encompasses various physical and tangible mechanisms for performing a task. For instance, each processing-related operation illustrated in the flowcharts of FIGS. 10-12 corresponds to a logic component for performing that operation.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems.

This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by a computing system, for determining whether a target item contains a computer-generated artifact produced by a computer-implemented transformation system, comprising:

receiving, by the computing system, a source item produced by an application program, the source item having plural source parts;

receiving, by the computing system, the target item, the target item having plural target parts, the target item being produced by transforming the source item into the target item using the computer-implemented transformation system, the computer-implemented transformation system being a first machine-trained model that has been trained to produce tokens of target items that summarize tokens of source items;

determining, by the computing system, whether the target parts in the target item are supported by the source item using an analysis process;

assigning, by the computing system, a label to the target item based on an outcome of the determining, the label indicating whether the target parts are supported by the source item; and automatically performing, by the computing system, an action based on the label to control a downstream system, the analysis process being implemented by the computing system and performs each of:

determining whether a particular target part of the plural target parts is supported by any individual source part using a computer-implemented natural language interface (NLI) system, the NLI system being a second machine-trained model;

in response to determining that the particular target part is not supported by any source part, forming a pairing of the particular target part and a portion of the source item, the portion of the source item being of a particular size that includes at least two source parts;

determining whether the particular target part is supported by the portion of the source item using the NLI system;

increasing a size of the portion of the source item in response to concluding that the particular target part is unsupported by the portion of the source item; and repeating the forming, determining whether the particular target part is supported by the portion of the source item, and increasing until it is determined that the particular target part is supported, or until it is determined that a maximum size of the portion of the source item has been reached and the particular target part remains unsupported, wherein the second machine-trained model that implements the NLI system has been trained to transform tokens of an instance of target content and an instance of source content into a classification result that indicates whether the instance of target content is supported or unsupported by the instance of source content, the instance of target content containing at least one computer-generated artifact when determined to be unsupported by the instance of source content.

2. The method of claim 1, wherein the source item is a source document, and wherein the plural source parts are plural source sentences in the source document, and wherein the target item is a target document, and wherein the particular target part of the plural target parts is a target sentence in the target document.

3. The method of claim 1, wherein the determining whether the target parts in the target item are supported by the source item occurs during a process of creation of the source item and/or a process of producing the target item by the computer-implemented transformation system.

4. The method of claim 1, wherein the forming produces the portion of the source item by:

selecting a group of particular source parts that most closely match the particular target part as determined by a computer-implemented similarity-assessing process, the group having a predetermined number of source parts; and concatenating the particular source parts in an order that matches an order in which the particular source parts appear in the source item.

5. The method of claim 4, wherein the selecting performed by the similarity-assessing process uses a term frequency-inverse document frequency score and/or a semantic score to determine an extent to which a given source part matches the particular target part.

6. The method of claim 5, wherein the semantic score measures a proximity of a vector representation of the given source part to a vector representation of the particular target part in a vector space.

7. The method of claim 1, wherein the action includes generating an output presentation that identifies any target parts of the plural target parts that are not supported by the source item.

8. The method of claim 1, wherein the action includes generating at least one other target item using the computer-implemented transformation system, until another target item is generated that is supported by the source item.

9. The method of claim 1, wherein the action includes automatically removing any target part of the plural target parts that has been identified as unsupported by the source item.

10. The method of claim 1, wherein the action includes preventing transfer of the target item to a target destination in response to determining that the target item is not supported by the source item.

11. The method of claim 10, wherein the source item is a dialogue transcript, wherein the target item is a summary of the dialogue transcript, and wherein the preventing comprises preventing a distribution system from distributing the summary when the summary is not supported by the dialogue transcript.

12. The method of claim 1, wherein the action includes suspending or revising an automated control action, in response to a finding that the target item is unsupported by the source item, the control action controlling a state of a physical system.

13. A computing system for determining whether a target item contains a computer-generated artifact produced by a computer-implemented transformation system, comprising:

an instruction data store for storing computer-readable instructions;

a processing system for executing a computer program based on the computer-readable instructions in the data store, to perform operations including:

receiving a source item, the source item having plural source parts;

receiving the target item, the target item having plural target parts, the target item being produced by transforming the source item into the target item using the computer-implemented transformation system, the computer-implemented transformation system being a first machine-trained model that has been trained to produce tokens of target items that summarize tokens of source items;

determining whether the target parts in the target item are supported by the source item using an analysis process, the analysis process including logic for progressively expanding a scope of source content to be considered when analyzing whether a particular target part of the target item is supported by the source item, wherein the determining uses a computer-implemented natural language interface (NLI) system, the NLI system being a second machine-trained model, wherein the second machine-trained model that implements the NLI system has been trained to transform tokens of an instance of target content and an instance of source content into a classification result that indicates whether the instance of target content is supported or unsupported by the instance of source content, the instance of target content containing at least one computer-generated artifact when determined to be unsupported by the instance of source content;

assigning a label to the target item based on an outcome of the determining, the label indicating whether the target parts are supported by the source item; and automatically performing an action based on the label in response to concluding at least one part of the target item is not supported by the source item.

14. The computing system of claim 13, wherein the progressively expanding includes:

determining whether the particular target part is supported by any individual source part using the NLI system;

in response to determining that the particular target part is not supported by any source part, forming a pairing of the particular target part and a portion of the source item, the portion of the source item being of a particular size that includes at least two source parts;

determining whether the particular target part is supported by the portion of the source item using the NLI system;

increasing a size of the portion of the source item in response to concluding that the particular target part is unsupported by the portion of the source item; and repeating the forming, determining whether the particular target part is supported by the portion of the source item, and increasing until it is determined that the particular target part is supported, or until it is determined that a maximum size of the portion of the source item has been reached and the particular target part remains unsupported.

15. The computing system of claim 14, wherein the forming operates by:

selecting a group of particular source parts that most closely match the particular target part, the group having a predetermined number of source parts; and concatenating the particular source parts in an order that matches an order in which the particular source parts appear in the source item.

16. A non-transitory computer-readable storage medium for storing computer-readable instructions, wherein a processing system executes the computer-readable instructions to perform operations, the operations comprising each of:

determining whether a particular target part of a target item is supported by any individual source part in a source item having plural source parts using a computer-implemented machine-trained natural language interface (NLI) system, the target item being produced by transforming the source item into the target item using a computer-implemented transformation system, the computer-implemented transformation system being a first machine-trained model that has been trained to produce tokens of target items that summarize tokens of source items;

in response to determining that the particular target part is not supported by any source part, selecting a group of particular source parts that most closely match the particular target part, as determined by a computer-implemented similarity-assessment process, the group having a predetermined number of source parts;

concatenating the particular source parts in an order that matches an order in which the particular source parts appear in the source item;

determining whether the particular target part is supported by the group of particular source parts using the NLI system, the NLI system being a second machine-trained model;

increasing a size of the group by one source part in response to concluding that the particular target part is unsupported by the group; and repeating the selecting, concatenating, determining whether the particular target part is supported by the group of particular source parts, and increasing until it is determined that the particular target part is supported, or until determining that a maximum size of the group of particular source parts has been reached and the particular target part remains unsupported and contains a computer-generated artifact, the operations further including, in response to determining that at least one target part is unsupported, automatically performing an action, wherein the second machine-trained model that implements the NLI system has been trained to transform tokens of an instance of target content and an instance of source content into a classification result that indicates whether the instance of target content is supported or unsupported by the instance of source content, the instance of target content containing at least one computer-generated artifact when determined to be unsupported by the instance of source content.

* * * * *